UNITED STATES PATENT OFFICE.

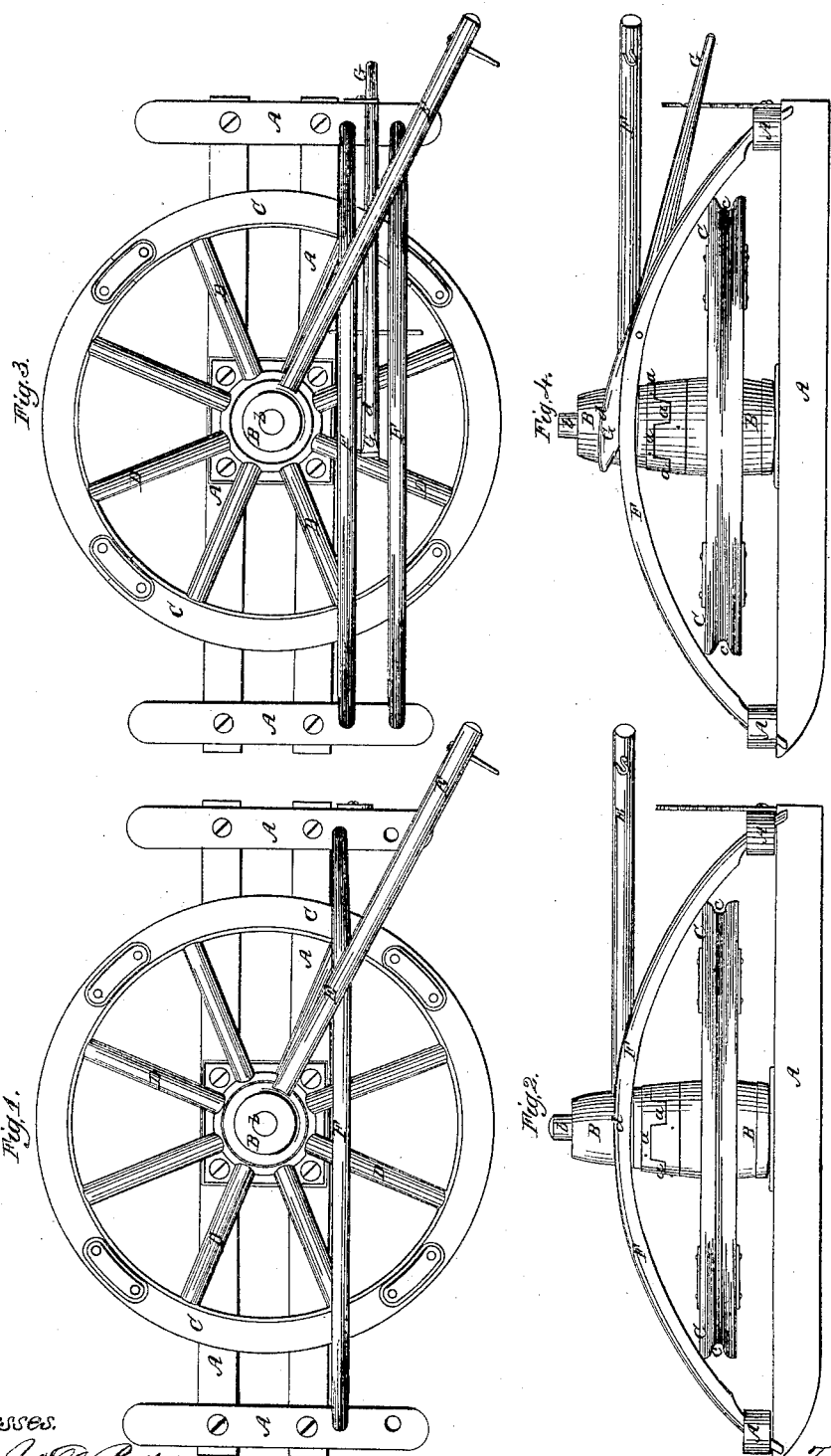

FRANK WICKS, OF KANSAS, ILLINOIS.

IMPROVED HORSE-POWER.

Specification forming part of Letters Patent No. 45,291, dated November 29, 1864.

*To all whom it may concern:*

Be it known that I, FRANK WICKS, of Kansas, in the county of Edgar and State of Illinois, have invented a new and useful apparatus for applying the power of a horse or team to the elevating of hay, as in building stacks, or for raising coal or other things from the hold of a vessel, or other similar hoisting purposes; and I do hereby declare the following to be a full, clear, and exact description of the construction and operation of the same, reference being had to the accompanying drawings, making a part of this specification, in which—

Figure 1 represents a top plan of the apparatus. Fig. 2 represents an elevation thereof. Fig. 3 represents a modification of the apparatus. Fig. 4 represents an elevation of the plan, Fig. 3.

Similar letters of reference where they occur in the separate figures denote like parts in all of them.

In raising hay onto a stack, as well as in raising many other things by a horse, the horse draws forward a distance equal to the height to which the hay or other thing is to be raised, and is then backed again to the place whence he started for the succeeding similar operation. But few horses are quiet enough to endure this backing, and frequently get frightened and injure themselves by kicking; and even with the most quiet horse it is an awkward operation, and has deterred many from the use of horse hay-elevators.

I am aware that capstans and windlasses have been so made as to be "let go by the run," when necessary to detach the cable or chain from the object to which it is attached; but these are too heavy, complicated, and expensive for domestic or farming purposes, besides they lack the portable character that things of this kind must possess to be useful about a farm, wharf, stone-quarry, or other places where portability and facility for putting up, taking down, or moving the apparatus becomes a necessity.

My invention consists in a simple wheel-elevator, the center or hub of which is in sections, but interlocked so as to turn together when the wheel, drum, or barrel is winding up the rope or chain, and so that when the upper section is raised up or detached from the lower section the wheel or drum and rope may run without the moving of the horse or team, as will be now explained, or while he may continue to move.

A is a frame which sets upon the ground and may be anchored or pinned there in any suitable manner, and near where the hoisting is to be done. Upon this frame A is mounted an upright hub or hollow shaft, B, which is divided into two sections, as at $a$, but with projections on one or both that take into corresponding concavities in the other, so that both sections will move together when interlocked by their projections and depressions, and move independent of each other when the upper section is raised up from the lower one a sufficient distance to disconnect them at their notches or teeth at $a$. This hub B, thus divided, turns upon a journal or pin, $b$, long enough to admit of the raising of the upper section without slipping off from it. The lower section of the hub carries a grooved rim or wheel, C, united to it by suitable spokes, D, the groove $c$ being for the rope to wind in. The upper section of the hub has a sweep, E, attached to it to which the horse or team is hitched. On the frame A there is a bow, F, which rises above the coupling-joint $a$ of the hub, this bow serving the purpose of a cam, or its equivalent, when the sweep E comes against it, and raises up said sweep and the upper section of the hub B with it until it becomes disconnected from the lower section, and then the sweep may stand still and the rope, wheel, or drum C can run independent of it. Suppose the wheel C to be ten feet in diameter. It would then be capable, by one revolution, of raising by single blocks a weight thirty feet high, which is as high as would be necessary for any ordinary purpose; or if it is only necessary to raise it the half of that height, then two of these bows or cams may be used; but, as shown in Fig. 2, whenever the sweep rides upon the crown of the bow or cam at $d$ the two sections of the hub are disconnected, and the rope with its fork, or whatever raising device may be appended to it, will run down or backward while the horse stands still, or may even continue on in the same circuit. But it may be desirable to have the rope to wind on a smaller drum or barrel, and then the horse may have to make two, three, four, or more revolutions around the apparatus before the height is gained. In such an event, a cam-lever, G, may be used, which, when it is necessarry to trip, unclutch, or disconnect the two sections, may be set by the attendant, as shown in Fig. 4, and when the sweep E comes in contact with it, and rides up on its cam-plane $d$, it will disconnect the two sections and allow the rope to run while the horse may stand still or continue on in the same uniform direction.

It is obvious that instead of the sweep riding up onto the cam or tripping mechanism, it may be an arm projecting from the hub, but not used as a sweep. The cam-plane or raising device may be altered in many known ways, and I have only shown one of the most simple of them, without confining myself to that kind of elevating or disconnecting mechanism. A friction-brake may be applied to the hub or wheel to check its speed when the fork or tackle is running down and adjusted to suit the falling or descending weight, and a guide pulley or block may be used to guide the rope from the wheel to the hoisting apparatus, and prevent the rope from leaving the wheel, and both the brake and block may be attached to the frame A.

Having thus fully explained the nature, object, and purpose of my invention, what I claim therein as new, and desire to secure by Letters Patent, is—

In combination with a divided or sectional hub in a hoisting apparatus, a sweep or its equivalent on one of the sections, and a rope-wheel or its equivalent on the other section, and a cam interposed, so that when the sweep rides upon the cam the sections of the hub will be disconnected and the rope allowed to run independent of the motion of the horse or team, substantially as described.

FRANK WICKS.

Witnesses:
WASHINGTON STEPLETON,
GEORGE VANLAW.